(12) United States Patent
Gierer et al.

(10) Patent No.: US 7,617,918 B2
(45) Date of Patent: Nov. 17, 2009

(54) DEVICE FOR THE OPERATION OF A STARTER MECHANISM THAT CAN BE BROUGHT INTO ACTIVE CONNECTION WITH A HYDRAULIC SUPPLY CIRCUIT OF A TRANSMISSION UNIT

(75) Inventors: Georg Gierer, Kressbronn (DE); Thilo Schmidt, Meckenbeuren (DE)

(73) Assignee: ZF Friedrichshafen AG, Friedrichshafen (DE)

(*) Notice: Subject to any disclaimer, the term of this patent is extended or adjusted under 35 U.S.C. 154(b) by 457 days.

(21) Appl. No.: 11/704,843

(22) Filed: Feb. 9, 2007

(65) Prior Publication Data
US 2007/0187204 A1 Aug. 16, 2007

(30) Foreign Application Priority Data
Feb. 10, 2006 (DE) .................. 10 2006 006 181

(51) Int. Cl.
*F16H 61/48* (2006.01)
(52) U.S. Cl. ...................... 192/3.3; 192/3.33
(58) Field of Classification Search ............. None
See application file for complete search history.

(56) References Cited

U.S. PATENT DOCUMENTS

| | | | | |
|---|---|---|---|---|
| 4,957,194 A | * | 9/1990 | Sawa et al. ............... 192/3.3 |
| 5,090,527 A | * | 2/1992 | Imamura et al. ........... 192/3.29 |
| 5,807,204 A | | 9/1998 | Shiiba et al. | |
| 5,965,811 A | | 10/1999 | Kawai et al. | |
| 6,544,139 B1 | | 4/2003 | Gierer et al. | |
| 2005/0269181 A1 | * | 12/2005 | Gierer et al. ............. 192/3.3 |

FOREIGN PATENT DOCUMENTS

DE   10 2005 016 495 A1   10/2006

OTHER PUBLICATIONS

"Elektrohydraulische Steuerung und äußere Schaltung des automatischen Getriebes W5A 330/580 von Mercedes-Benz", *Automobiltechnischen Zeitschrift 97* (1995), Nr. 10, pp. 698-706.

* cited by examiner

*Primary Examiner*—Rodney H Bonck
(74) *Attorney, Agent, or Firm*—Davis & Bujold, P.L.L.C.

(57) ABSTRACT

A device for operating a starter mechanism actively connected with a hydraulic supply circuit of a transmission unit. The starter mechanism has a piston chamber subject to hydraulic pressure for activating a frictional shift element and a hydraulic chamber subject to hydraulic pressure for the cooling and lubricating an area of the starter mechanism. A hydraulic pressure between a lubrication pressure control port of a second pressure relief valve and the hydraulic chamber and equivalent to a lubrication pressure, is exerted on a second back pressure outlet port of a first relief valve, which acts on a valve slide of the first relief valve in the opposite direction relative to the working pressure exerted on a first back pressure outlet port of the first relief valve so that the pressure feed-back of the hydraulic pressure to the first relief valve occurs additively to the pilot signal characteristic of the first relief valve.

27 Claims, 9 Drawing Sheets

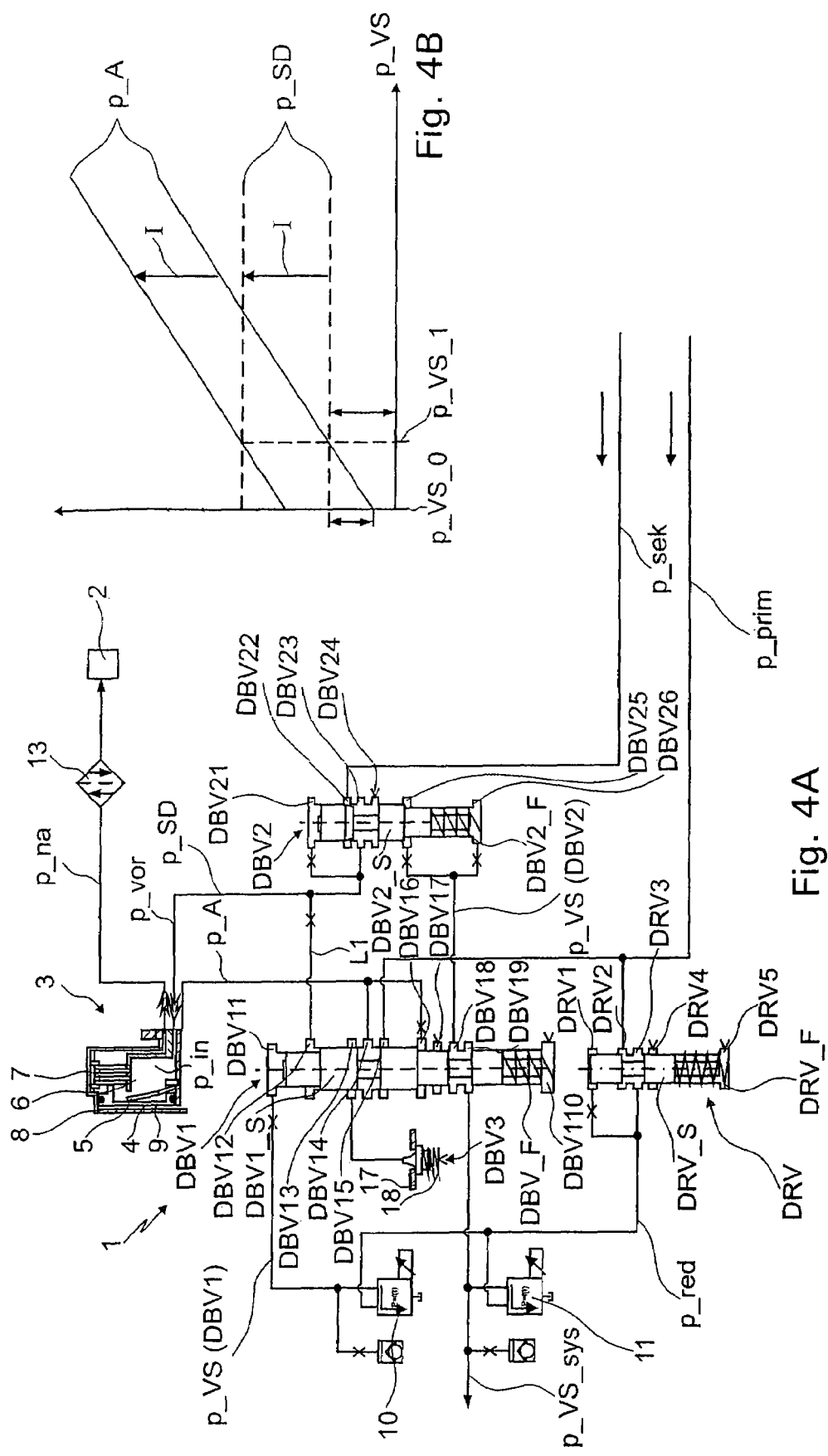

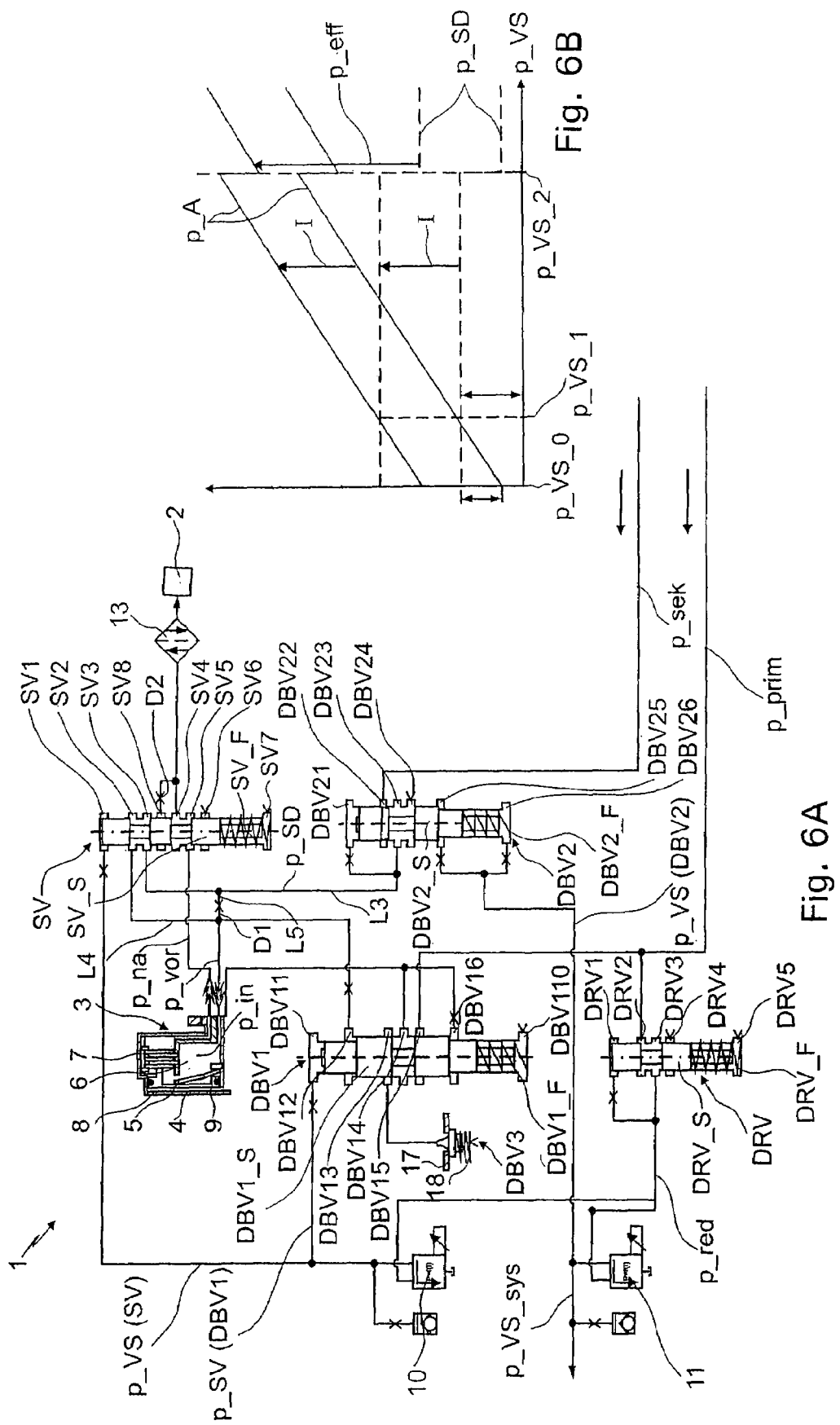

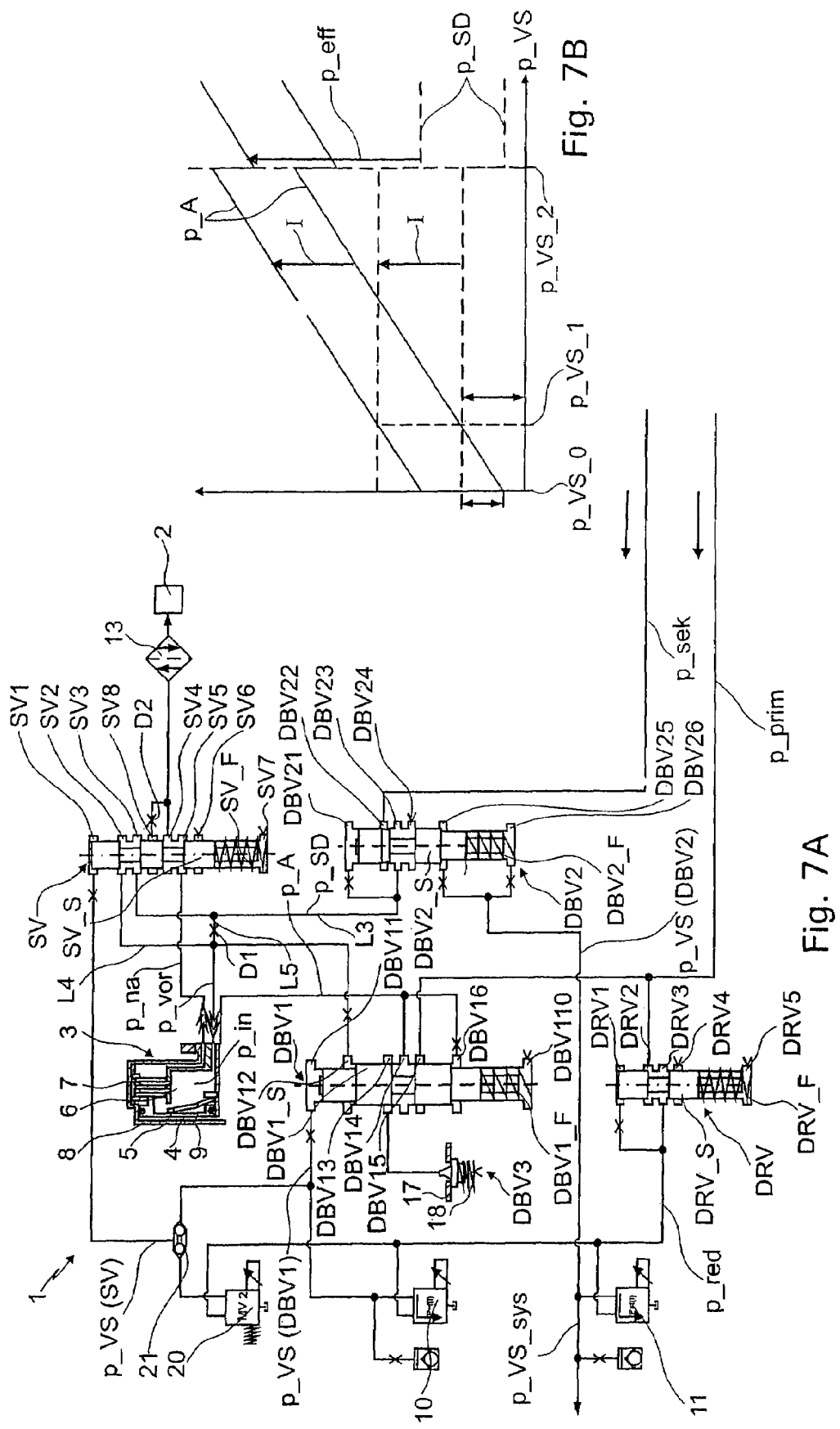

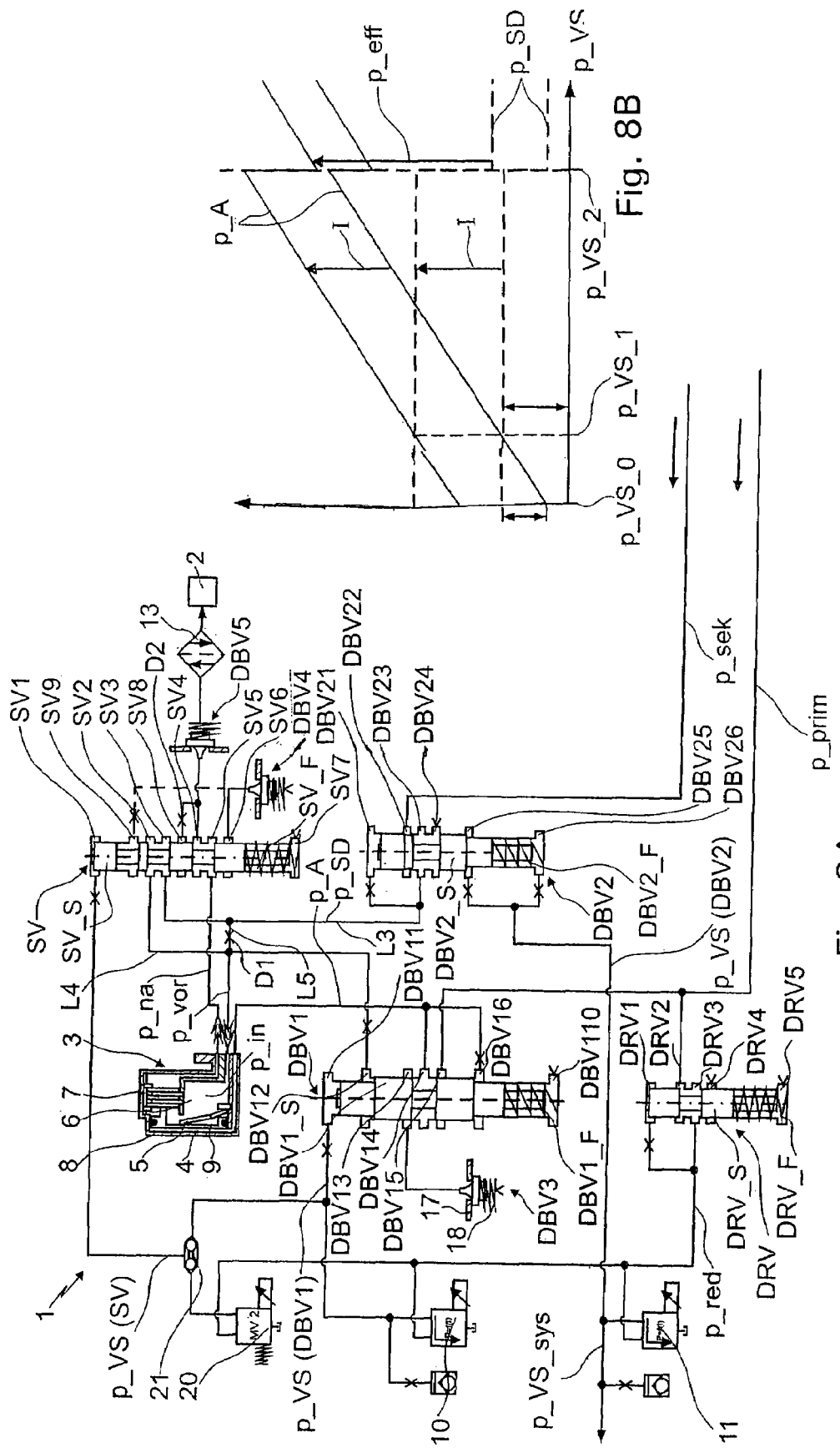

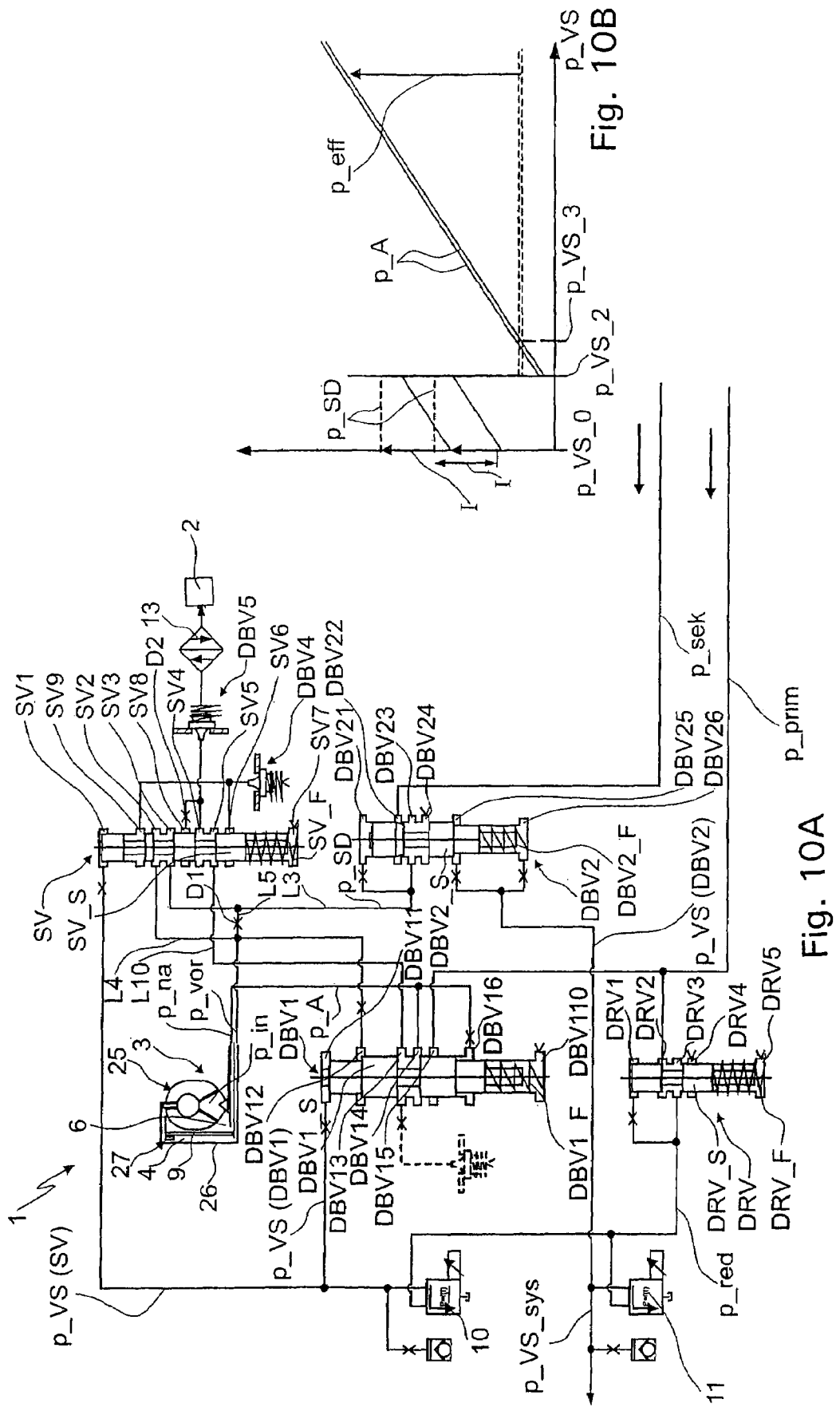

DEVICE FOR THE OPERATION OF A STARTER MECHANISM THAT CAN BE BROUGHT INTO ACTIVE CONNECTION WITH A HYDRAULIC SUPPLY CIRCUIT OF A TRANSMISSION UNIT

This application claims priority from German Application Ser. No. 10 2006 006 181.0 filed Feb. 10, 2006.

FIELD OF THE INVENTION

The invention concerns a device for the operation of a starter mechanism that can be brought into active connection with a hydraulic supply circuit of a transmission unit.

BACKGROUND OF THE INVENTION

The drive trains of vehicles known from common practice are usually made with internal combustion engines which run at a minimum speed. To start off when the vehicle is at rest, a speed gap between the lowest engine operating speed and the static transmission input shaft of a transmission unit has to be bridged by way of a speed converter or a starter mechanism. As is known, such starter mechanisms are made as a dry clutch in the case of manual shift transmissions and in the case of conventional automatic transmissions as a hydrodynamic torque converter or in the form of an automated starter clutch as a wet-running disk clutch.

To reduce or eliminate the hydraulic losses that occur in the area of hydrodynamic torque converters, it has become customary to associate converter bridging clutches with torque converters. In the engaged condition of a converter bridging clutch, a torque transfer in a vehicle drive train is bridged in the area of a torque converter. The torque transfer then takes place essentially with lower losses via a connection made by friction.

Here, a fundamental distinction must be made between two different system groups of starter mechanisms that comprise a torque converter and a converter bridging clutch corresponding thereto.

In a first system group the hydraulic actuation of the converter bridging clutch is integrated in the hydraulic fluid circuit of the corresponding hydraulic torque converter, such systems being known as two-line converters. A converter clutch piston of a two-line converter, provided in order to actuate the converter bridging clutch and that can be acted upon by hydraulic pressure in the area of a piston chamber, is formed as a flexible disk whose hub is in a rotationally fixed connection with a turbine of the hydrodynamic torque converter.

When the converter bridging clutch is disengaged, the converter clutch piston is acted upon by a flow of oil coming from an inlet side of the hydrodynamic torque converter, which flows through a hydraulic chamber of the starter mechanism towards a return side of the hydrodynamic torque converter and the piston chamber and flows around the piston. To close the converter bridging clutch an inlet pressure of the hydrodynamic torque converter is reduced essentially to zero or cut off so that a static total pressure existing in the hydraulic chamber of the hydrodynamic torque converter also falls essentially to zero. In the latter operating condition of the hydrodynamic torque converter the converter clutch piston, which is spring-loaded in the closing direction of the converter bridging clutch and which is coated with a friction lining on a side facing away from the hydrodynamic torque converter, is pushed by the spring mechanism of the converter clutch piston towards the housing on the pump side of the hydrodynamic torque converter.

To increase the transmission capacity of the converter bridging clutch and thus also the torque that can be transferred by the converter bridging clutch, an inlet pressure of the converter bridging clutch is increased. This increase of the inlet pressure of the converter bridging clutch increases the pressure of the converter clutch piston against the housing of the pump side of the hydrodynamic torque converter. Moreover, when the converter bridging clutch is engaged the converter clutch piston reduces the oil flow through the hydrodynamic torque converter to a predefined minimum so that the converter clutch piston of the converter bridging clutch performs essentially the same function as a conventional hydraulic one-way valve.

To avoid compromising the driving comfort, the converter bridging clutch is preferably only engaged in drive train operating conditions during which, effects acoustically perceptible by the driver in the vehicle and caused by speed irregularities of an internal combustion engine of the drive train, are absent. In opposition to this, however, is the desire to close the converter bridging clutch as soon as possible during a starting process in order to reduce the hydraulic power loss that occurs in the hydrodynamic torque converter when the converter bridging clutch is disengaged.

From *Automobiltechnischen Zeitschrift* (Journal of Automotive Technology) 97 (1995), No. 10, pp. 698-706, "Electrohydraulic Control and External Shifting of the WSA 330/580 Automatic Transmission by Mercedes-Benz", a device is known for the operation of a hydrodynamic torque converter with a corresponding converter bridging clutch. The converter bridging clutch is actuated separately from the hydraulic fluid circuit of the torque converter. The piston chamber of the converter bridging clutch can be acted upon by the hydraulic actuation pressure needed for actuating the converter bridging clutch via a control line, separate from the hydraulic through-flow area of the torque converter while, as in the case of a two-line converter, the converter bridging clutch is spatially integrated in the housing of the torque converter. Such starter devices are customarily referred to as three-line converters and in that case belong mainly to the second system group.

The known devices for operating starter mechanisms of the first and those of the second system groups have control lines connected by valve mechanisms of the devices which are, in each case, connected by hydraulic lines of a hydraulic line system to the torque converter and the converter bridging clutch so as to be able to apply the respective necessary actuation pressures in a manner that depends on the operating conditions.

Similarly to two-line or three-line converters, starter mechanisms made as wet disk clutches are constructed with a so-termed clutch chamber and with a hydraulic chamber. The clutch chamber being acted on by hydraulic pressure to actuate the disk clutch while the hydraulic chamber can be acted upon by hydraulic pressure to cool and lubricate the disks engaged with one another.

Both in the starter mechanisms of the said two systems groups and also in wet-operating disk clutches in which the piston chamber and the hydraulic chamber are at least in part spatially separated from one another by the clutch piston. The hydraulic pressure present in the hydraulic chamber acts disadvantageously against the hydraulic pressure in the piston chamber during a engaging process of the disk clutch or of the converter bridging clutch associated with the torque converter.

In this, it is particularly disadvantageous that the hydraulic pressure in the hydraulic chamber can only be determined with technical difficulty so that the hydraulic pressure applied in the piston chamber to engage the disk clutch in unfavorable situations of a drive train, during which the hydraulic pressure in the hydraulic chamber becomes unacceptably high, is insufficient to produce the required operating-situation-dependent transmission capacity of the disk clutch. In particular, critical operating situations of a drive train, ignorance of the hydraulic conditions prevailing in the hydraulic chamber has the result that the transmission capacity of the disk clutch during a starting process is reduced by an increase of the hydraulic pressure in the hydraulic chamber to such an undesired extent that driving comfort is compromised by irregularities in the variation of a drive output torque applied at the output of the drive train or the vehicle.

Accordingly, the purpose of the present invention is to provide a device for the operation of a starter mechanism that can be brought into active connection with a hydraulic supply circuit of a transmission unit by way of which irregularities in the variation of a drive output torque that compromise a high level of driving comfort are reliably avoided.

SUMMARY OF THE INVENTION

In the device according to the invention for operating a starter mechanism that can be brought into active connection with a hydraulic supply circuit of a transmission unit, which is made with a piston chamber that can be acted on by hydraulic pressure in order to actuate a frictional shift element and with a hydraulic chamber that can be acted on by hydraulic pressure for the cooling and lubrication of an area of the starter mechanism, a first pressure-variable pressure relief valve is provided to regulate a working pressure that can be delivered to the piston chamber, and a second pressure-variable pressure relief valve is provided to regulate the lubrication pressure that can be delivered to the hydraulic chamber. Valve slides of the two pressure relief valves can be controlled in each case as a function of pilot pressures that can be set by pressure control valves and spring mechanisms that engage therewith, such that the working pressure acts on a first back pressure outlet control port of the first pressure relief valve and the lubrication pressure acts on a back pressure outlet control port of the second pressure relief valve.

According to the invention, a hydraulic pressure, existing in the area between a lubrication pressure control switch of the second pressure relief valve and a return area of the hydraulic chamber of the starter mechanism and is equivalent to the lubrication pressure, can be applied to a second back pressure outlet control port of the first pressure variable pressure relief valve. This pressure acting on the valve slide of the first pressure variable pressure relief valve in the opposite direction, relative to the working pressure applied on the first back pressure outlet control port, so that the back pressure of the hydraulic pressure on the first pressure relief valve takes place additively to the pilot signal characteristic of the first pressure relief valve.

In a simple way, this ensures that the working pressure that exists in the piston chamber and can be adjusted in a controlled manner is adjusted over the full operating range of the starter mechanism as a function of the controllably set lubrication pressure in the area of the hydraulic chamber of the starter mechanism, and that variations of the hydraulic pressure result in an adaptation of the working pressure in the piston chamber.

This means that changes of the temperature-dependent and speed-dependent, hydraulic pressure, in the area between the lubrication pressure control port of the second pressure relief valve and the return area of the hydraulic chamber have essentially no influence on the transmission capacity of the frictional shift element of the starter mechanism determined by the working pressure acting in the piston chamber at the time, and irregularities in the variation of a drive output torque at the drive output of a vehicle drive train are reliably avoided.

In a further development of the device according to the invention, during a return of the hydraulic pressure existing in the hydraulic chamber of the starter mechanism on the second back pressure outlet control port of the first pressure relief valve in the area of the first back pressure outlet control port, with the first active surface area of the valve slide of the first pressure relief valve there in essence corresponds a second active surface area of the valve slide of the first pressure relief valve, which can be acted upon via the first back pressure outlet control port of the first pressure relief valve by the working pressure. The result of this is that a change of the hydraulic pressure existing directly in the hydraulic chamber produces an equal change of the working pressure in the piston chamber of the starter mechanism.

In a further advantageous embodiment of the device according to the invention, in which a return of the hydraulic pressure existing in an inlet area of the hydraulic chamber of the starter mechanism between the second pressure relief valve and the hydraulic chamber to the second back pressure outlet control port of the first pressure relief valve is provided, a first active surface area of the valve slide of the first pressure relief valve that can be acted upon in the area of the second back pressure outlet control port by the hydraulic pressure is smaller than a second active surface area of the valve slide of the first pressure relief valve, which can be acted upon by the working pressure via the first back pressure outlet control port of the first pressure relief valve.

In a simple manner, this takes into account that the hydraulic pressure upstream from the hydraulic chamber of the starter mechanism is larger, because of hydrodynamic losses, than the hydraulic pressure directly within the hydraulic chamber, and variations of the hydraulic pressure in the inlet area of the hydraulic chamber are larger than variations of the hydraulic pressure directly in the hydraulic chamber.

Alternatively to the latter embodiment of the device according to the invention, in another advantageous version of the device, it is provided that the hydraulic pressure existing in a return area of the hydraulic chamber is fed back to the second back pressure outlet control port of the first pressure relief valve, and that a first active surface area of the valve slide of the first pressure relief valve that can be acted upon in the area of the first back pressure outlet control port by the hydraulic pressure, is larger than a second active surface area of the valve slide of the first pressure relief valve, which can be acted upon by the working pressure via the first back pressure outlet control port, in order to convert variations of the hydraulic pressure acting in the return area of the hydraulic chamber, which is smaller because of hydrodynamic losses than the direct hydraulic pressure in the hydraulic chamber into corresponding adaptations of the working pressure.

Alternatively, a combination of the two compensation areas is also conceivable. The sum of the areas then corresponds to the back-coupling area of the valve. In this way, variations of the flow resistance, due to temperature or hydrodynamic effects, can be compensated.

BRIEF DESCRIPTION OF THE DRAWINGS

The invention will now be described, by way of example, with reference to the accompanying drawings. For the sake of clarity, the same reference numerals are used for components with the same structure and function. The drawings show:

FIG. 4A is a representation corresponding to that of FIG. 1A, showing another example embodiment of the device according to the invention FIG. 4B are variations of the working pressure, shown in FIG. 4A, in the inlet area of the piston chamber and of the lubrication pressure in the inlet area of the hydraulic chamber, produced by pilot pressure control of the first and second pressure relief valves, represented as in FIG. 1B;

FIG. 6A is a hydraulic layout of another example embodiment of the device according to the invention;

FIG. 6B are variations of the working pressure in the inlet area of the piston chamber of the starter mechanism and variations of the hydraulic pressure in the inlet area of the hydraulic chamber downstream from the pilot valve of the device in FIG. 6A;

FIG. 7A is a hydraulic layout of a further example embodiment of the device according to the invention, in which the pilot valve can additionally be controlled by a pilot pressure set by a magnetic valve FIG. 7B are variations of the working pressure in the inlet area of the piston chamber of the starter mechanism of the device shown in FIG. 7A, and variations of the hydraulic pressure in the inlet area of the hydraulic chamber downstream from the pilot valve;

FIG. 8A is a hydraulic layout of another example embodiment of a device according to the invention;

FIG. 8B are variations of the working pressure in the inlet area of the piston chamber, and of the hydraulic pressure in the inlet area of the hydraulic chamber of the starter mechanism in FIG. 8A;

FIG. 10A is a hydraulic scheme of another example embodiment of the device according to the invention for the operation of a starter mechanism made as a two-line converter, and FIG. 10B are variations of the working pressure in the inlet area of the piston chamber of a converter bridging clutch of the two-line converter shown in FIG. 10a, and variations of the hydraulic pressure in the inlet area of the hydrodynamic torque converter downstream from the pilot valve, produced by pilot pressures of the first and second pressure relief valves and the pilot valve.

DETAILED DESCRIPTION OF THE INVENTION

Figure 1:
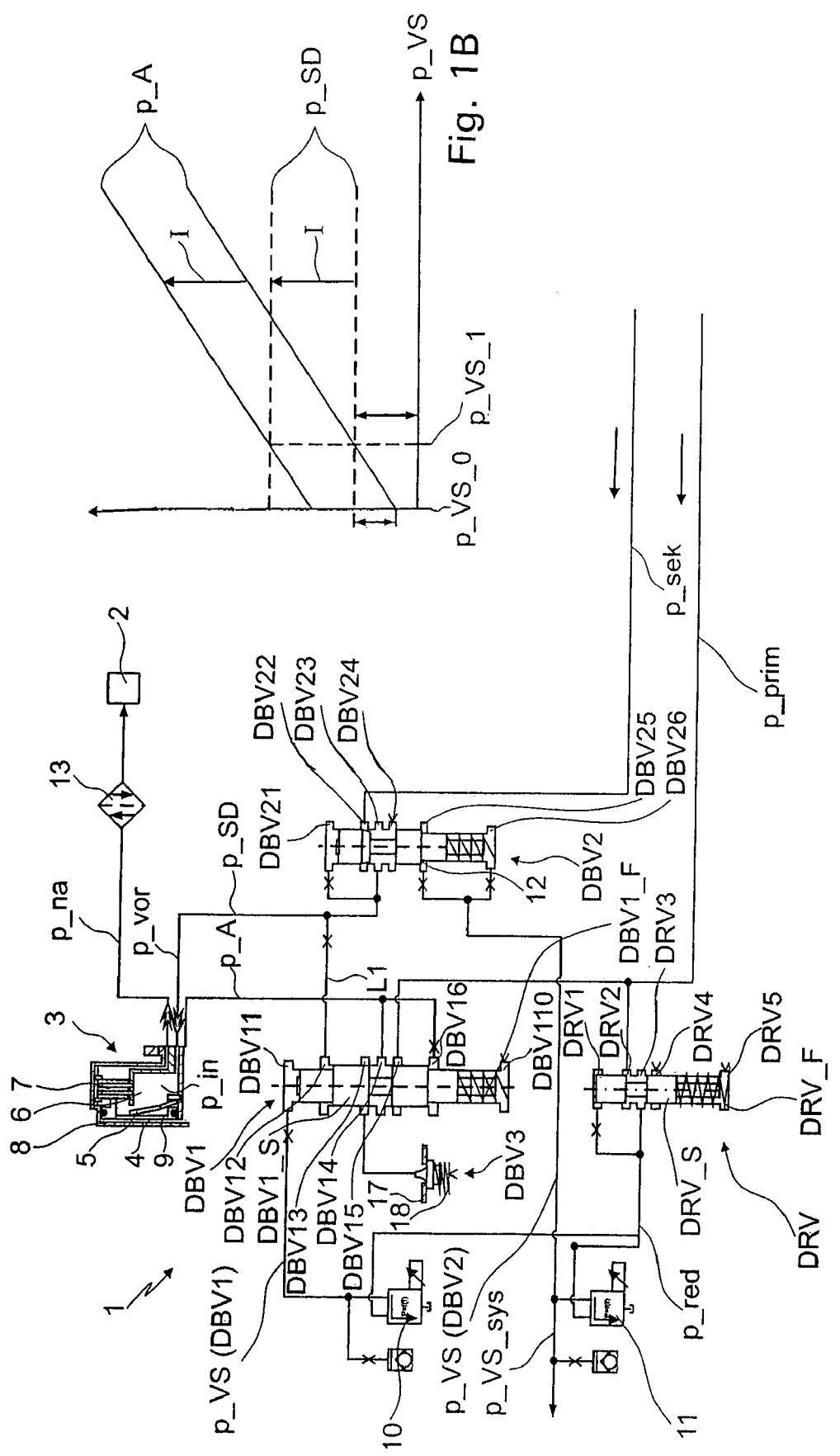
FIG. 1A is a schematic circuit diagram of the device according to the invention for operating a starter mechanism made as a wet-running disk clutch.
FIG. 1B is two respective variations of the working pressure in an inlet area of the piston chamber of the starter mechanism and of the lubrication pressure in the inlet area of the hydraulic chamber of the starter mechanism, produced by pilot pressures with which a first pressure relief valve and a second pressure relief valve are controlled.

FIG. 1A shows a device (system) 1 for the operation of a starter mechanism 3, in this case made as a wet-operating disk clutch which can be brought into active connection with a hydraulic supply circuit 2 of a transmission unit of a vehicle not shown in any greater detail. The starter mechanism 3 is made with a piston chamber 4 that can be acted upon by a hydraulic pressure p_A to actuate the frictional shift element or starter mechanism 3 against a spring device 5. In addition, the starter mechanism 3 is made with a hydraulic chamber 6 in which is arranged a disk packet 7 that must be cooled, particularly during slipping operation of the starter mechanism 3. The piston chamber 4 and the hydraulic chamber 6 of the starter mechanism 3 are separated from one another by a piston 9 arranged to slide longitudinally in a housing 8, so that a hydraulic pressure p_in present in the hydraulic chamber 6, together with the spring force of the spring device 5 of the starter mechanism 3, oppose actuation of the disk packet 7 by the piston 9 by acting in the disengagement direction of the starter mechanism 3.

To regulate the working pressure p_A that can be delivered to the piston chamber 4, a first pressure-variable pressure relief valve DBV1 is provided, which comprises a plurality of control ports DBV11 to DBV16 and DBV110, a valve slide DBV1_S and a spring device DBV1_F which acts on the valve slide DBV1_S. The hydraulic pressure p_in acting in the hydraulic chamber 6, which is equivalent to a lubrication pressure p_SD, is regulated by a second pressure-variable pressure relief valve DBV2, which is also made with a plurality of control ports DBV21 to DBV26 and a valve slide DBV2_S and a spring device DBV2_F which acts upon the valve slide DBV2_S.

The first pressure relief valve DBV1 can be acted upon on its end of the valve slide DBV1_S that faces away from the spring device DBV1_F with a pilot pressure p_VS(DBV1) which can be adjusted by way of a pressure control valve 10, in order to be able to adjust the working pressure p_A as a function of the operating situation. At the same time, the valve slide DBV2_S of the second pressure relief valve DBV2 can be acted upon, via a pilot pressure control port or spring chamber control port DBV26, in the area of its end facing towards the spring device DBV2_F, by a pilot pressure p_VS (DBV2) that can be adjusted by way of a further pressure control valve 11, so that the pilot pressure p_VS(DBV2) can also be applied via a second pilot pressure control port DBV25 of the second pressure relief valve DBV2 to an annular active surface area 12 of the valve slide DBV2_S of the second pressure relief valve DBV2 when the valve slide DBV2_S is in an appropriate position.

The two pressure control valves 10 and 11 are acted upon via a pressure regulation valve DRV, by a controlled adjustable reducing pressure p_red, which is set as a function of a primary pressure p_prim of a primary pressure circuit applied to the pressure regulation valve DRV. The pressure regulation valve DRV is also made with a plurality of control ports DRV1 to DRV5, a valve slide DRV_S and a spring device DRV_F, such that the reducing pressure p_red, adjusted by the pressure regulation valve DRV, is applied on a back pressure outlet control port DRV1, acting upon it on the end of the valve slide DRV_S that faces away from the spring device DRV_F. As the value of the reducing pressure p_red increases, the valve slide DRV_S is pushed further in the direction of a spring chamber control port DRV5 so that if the value of the reducing pressure p_red becomes unacceptably high, the connection between a supply control port DRV2 acted upon by the primary pressure p_prim and a reducing pressure control port DRV3 is blocked by the valve slide.

At the same time, a connection between the reducing pressure control port DRV3 and a relief control port DRV4 of the pressure regulation valve DRV is opened by the valve slide, so that the reducing pressure p_red present downstream from the pressure regulation valve DRV is reduced in the direction of an unpressurized area of the device 1. The unpressurized area of the device 1 can be, for example, an oil sump of a transmission unit made as an automatic gearbox or any other hydraulic fluid reservoir.

In addition, a system pressure valve (not shown in more detail in FIG. 1A) of a hydraulic system of a transmission unit is controlled by the second pressure control valve 11 with a pilot pressure p_VS_sys adjusted by way of the second pressure control valve 11, which corresponds to the pilot pressure p_VS(DBV2) of the second pressure relief valve DBV2, so that the second pressure control valve 11 has a dual function. The system pressure valve reduces or limits a pump delivery pressure of a hydraulic pump of the transmission unit's hydraulic system, so that the hydraulic pump produces a pressure build-up which only corresponds to the torque currently flowing in the drive train. In this way for example, when higher torque values are delivered by the drive train, entailing greater cooling power, a larger amount of hydraulic fluid is also made available for cooling the starter mechanism.

The electric control of the second pressure control valve preferably takes place by an electric transmission control unit which, in order to determine the torque currently being delivered by the drive train, is connected for example to an engine control unit or to a measurement unit for determining the current torque. This means that the electronic transmission control unit transmits to the second pressure control valve 11 an electric signal proportional to the torque currently flowing in the drive train which, on the one hand, produces a system pressure corresponding to the current torque in the transmission's hydraulic system and, on the other hand, ensures that the starter mechanism is supplied with the lubrication pressure p_SD required for sufficient cooling and lubrication of the starter mechanism.

The primary pressure p_prim is also applied to a supply control port DBV15 of the first pressure relief valve DBV1, which, depending on the position of the valve slide DBV1_S, can be connected with a working pressure control port DBV14 of the first pressure relief valve DBV1. Via the working pressure control port DBV14, the piston chamber 4 of the starter mechanism 3 can be acted upon by the working pressure p_A which, therefore, depends on the primary pressure p_prim.

To regulate the working pressure p_A, the working pressure control port DBV14 is additionally connected to a back pressure outlet control port DBV16 to which the working pressure p_A in the area of the first pressure relief valve DBV1 is returned in such manner that, in the area of the back pressure outlet control port DBV16, the working pressure p_A acts upon the valve slide DBV1_S of the first pressure relief valve DBV1 in the same direction as the spring force of the spring device DBV1_F and the pilot pressure p_VS(D-BVB1) acting on the valve slide DBV1_S.

A hydraulic pressure p_vor existing in the inlet area of the hydraulic chamber 6, which is equivalent to the lubrication pressure p_SD, is adjusted via the second pressure relief valve DBV2 as a function of a secondary pressure p_sek of a secondary pressure circuit applied to a supply control port DBV22 of the second pressure relief valve DBV2, the spring device DBV2_F, the pilot pressure p_VS(DBV2) applied to the pilot pressure control ports DBV25 and DBV26, and the lubrication pressure p_SD applied to a back pressure outlet control port DBV21 via the second pressure relief valve DBV2. Owing to hydraulic flow losses, the hydraulic pressure p_in acting inside the hydraulic chamber 6 is lower than the hydraulic pressure p_vor in the inlet area of the hydraulic chamber 6.

In the inlet area of the hydraulic chamber 6, i.e., between the second pressure relief valve DBV2 and the hydraulic chamber 6, a control line L1 branches off towards the first pressure relief valve DBV1, so that the lubrication pressure p_SD is applied on a second back pressure outlet control port DBV12 of the first pressure relief valve DBV1 and, when the valve slide DBV1_S is appropriately positioned, acts upon the valve slide DBV1_S of the first pressure relief valve DBV1 in the same direction as the pilot pressure p_VS (DBV1). Thus, the back pressure on the first pressure relief valve DBV1, of a lubrication pressure p_SD that corresponds to the hydraulic pressure p_in present in the hydraulic chamber 6, acts additively to the pilot signal characteristic of the first pressure relief valve DBV1, and as a result the working pressure p_A delivered to the piston chamber 4 to actuate the starter mechanism 3 is adjusted at least approximately as a function of the hydraulic pressure p_in the hydraulic chamber 6, and changes of the hydraulic pressure p_in in the hydraulic chamber result in approximately equal changes of the working pressure p_A in the piston chamber 4 of the starter mechanism 3.

To avoid unacceptably high values of the working pressure p_A, if p_A exceeds a certain pressure value, the working pressure control port DBV14 of the first pressure relief valve DBV1 is connected to a back pressure outlet control port DBV13, which is connected to an unpressurized hydraulic fluid reservoir via a third pressure relief valve DBV3, in this case made as a plate valve. By virtue of the said third pressure relief valve DBV3 it is ensured that the pressure level in the line system of the device 1 does not fall below a predefined value. The third pressure relief valve DBV3 comprises a valve plate 17 spring loaded against the hydraulic pressure present in the area of the pressure relief control port DBV13, and a spring device 18. Thus, the minimum pressure that can be set by the third pressure relief valve DBV3 in the line system of the device 1 depends on the active plate area of the plate valve 17 that can be acted upon by the hydraulic pressure in the area of the relief control port DBV13, and on the spring force of the spring device 18 of a third pressure relief valve DBV3, and can be changed for example by varying those two parameters as a function of the operating condition of the device 1 in each case.

FIG. 1B shows two respective variations of the working pressure p_A in the inlet area of the piston chamber 4 and of the lubrication pressure p_SD in the inlet area of the hydraulic chamber 6 of the starter mechanism 3, shown in FIG. 1A, by virtue of the pilot pressure p_VS(DBV1) of the first pressure relief valve DBV1 and by virtue of the pilot pressure p_VS (DBV2) of the second pressure relief valve DBV2, the two working pressure p_A variations and the two lubrication pressure p_SD variations obtained, respectively, at pilot pressure p_VS_sys and p_VS_(DBV2) of the second pressure control valve 11 set at different levels, having the same gradients in each case.

At a first pilot pressure value p_VS_0, which is essentially 0 bar, the lubrication pressure p_SD delivered to the hydraulic chamber 6 of the starter mechanism 3 is higher than the working pressure p_A delivered to the piston chamber 4 of the starter mechanism 3, and the difference between the lubrication pressure p_SD and the working pressure p_A at the first pilot pressure value p_VS_0 amounts essentially to a pressure value which corresponds to the spring force of the spring device 5 acting on the piston 9 of the starter mechanism 3.

The variation of the lubrication pressure p_SD is essentially constant over the entire pilot pressure range p_VS of the pilot pressure p_VS(DBV1) and, in FIG. 1B, can be displaced relative to the abscissa in the manner indicated by the arrow I by varying the pilot pressure p_VS(DBV2) or p_VS_sys. By varying the pilot pressure p_VS(DBV2) or p_VS_sys that can be adjusted by way of the second pressure control valve 11, the working pressure p_A can be displaced along the ordinate in the same manner as the lubrication pressure p_SD variation, in each case by the same value as the latter.

In addition, the variations of the working pressure p_A represented in FIG. 1B behave proportionally to the pilot pressure p_VS(DBV1) of the first pressure relief valve DBV1, increasing regularly and linearly from the first pilot pressure value p_VS_0 over the pilot pressure range p_VS.

The level of the lubrication pressure p_SD at the first pilot pressure value of p_VS_0 is determined essentially at a pilot pressure value p_VS(DBV2) of the second pressure relief valve 11 of 0 bar and by the spring force of the spring device DBV2_F of the second pressure relief valve DBV2 exerted on the valve slide DBV2_S, so that at a constant pilot pressure p_VS(DBV2) of the second pressure relief valve DBV2, the lubrication pressure p_SD remains at that pressure level. With increasing pilot pressure p_VS(DBV1) the working pressure p_A increases and at a second pilot pressure value p_VS_1 of the pilot pressure p_VS(DBV1) of the first pressure relief valve DBV1, reaches the level of the lubrication pressure p_SD, so that the forces acting on the piston 9 of the starter mechanism 3 are essentially balanced. As the values of the pilot pressure p_VS(DBV1) of the first pressure relief valve DBV1 increase still further, the working pressure p_A exceeds the lubrication pressure p_SD, so that the piston 9 compresses the disk packet 7 increasingly and the transmission capacity of the starter mechanism 3 rises until the disk clutch or starter mechanism 3 is fully engaged.

The hydraulic volume flow delivered to the hydraulic chamber 6 from the second pressure relief valve DBV2 is then passed to the supply circuit 2 of the transmission unit, the hydraulic fluid first flowing through a cooler 13 to reduce its temperature, if need be, before the hydraulic fluid enters the supply circuit 2.

As described earlier, the torque-transmitting portion of the starter mechanism 3 is supplied with the primary system pressure or primary pressure p_prim, while the cooling oil volume flow, passing through the hydraulic chamber 6, is supplied at the secondary system pressure or secondary pressure p_sek. The cooling of the disk packet 7 of the starter mechanism 3 and the hydraulic pressure p_in acting inside the hydraulic chamber 6 of the starter mechanism 3, according to FIG. 1A, which constitutes an opposing pressure to the working pressure p_A in the piston chamber 4, depend markedly on the temperature of the hydraulic fluid and the speed of an engine of the vehicle's drive train. This speed and temperature dependence directly affects the transmission capacity of the starter mechanism 3, since the resultant force component exerted on the piston 9 of the starter mechanism 3 stems from the difference between the working pressure and the lubrication pressure.

To be able to reflect the speed and temperature dependence of the lubrication pressure p_SD or the hydraulic pressures p_vor, p_in or p_na equivalent thereto directly in the working pressure p_A, in the manner described earlier, the lubricant pressure p_SD is fed back additively to the proportional pilot pressure signal characteristic of the first pressure relief valve DBV1, via the line L1, to the second back pressure outlet control port DBV1 of the first pressure relief valve DBV1. Ideally, this changes the working pressure p_A or pressure in the piston chamber 4 of the starter mechanism 3 by exactly the same amount as the change of the hydraulic pressure p_in in the hydraulic chamber 6 caused by its temperature and/or speed dependence.

Since the hydraulic pressure p_in inside the hydraulic chamber 6 cannot be fed back directly from the hydraulic chamber 6 to the second back pressure outlet control port DBV12 of the first pressure relief valve DBV1 or can only be so with considerable design complexity, second back pressure outlet control port DBV12 of the first pressure relief valve DBV1 is preferably acted upon by the hydraulic pressure p_vor or p_na present at the inlet area of the hydraulic chamber 6 downstream from the second pressure relief valve DBV2 and/or in the return area of the hydraulic chamber 6 upstream from the cooler 13.

Figure 2:
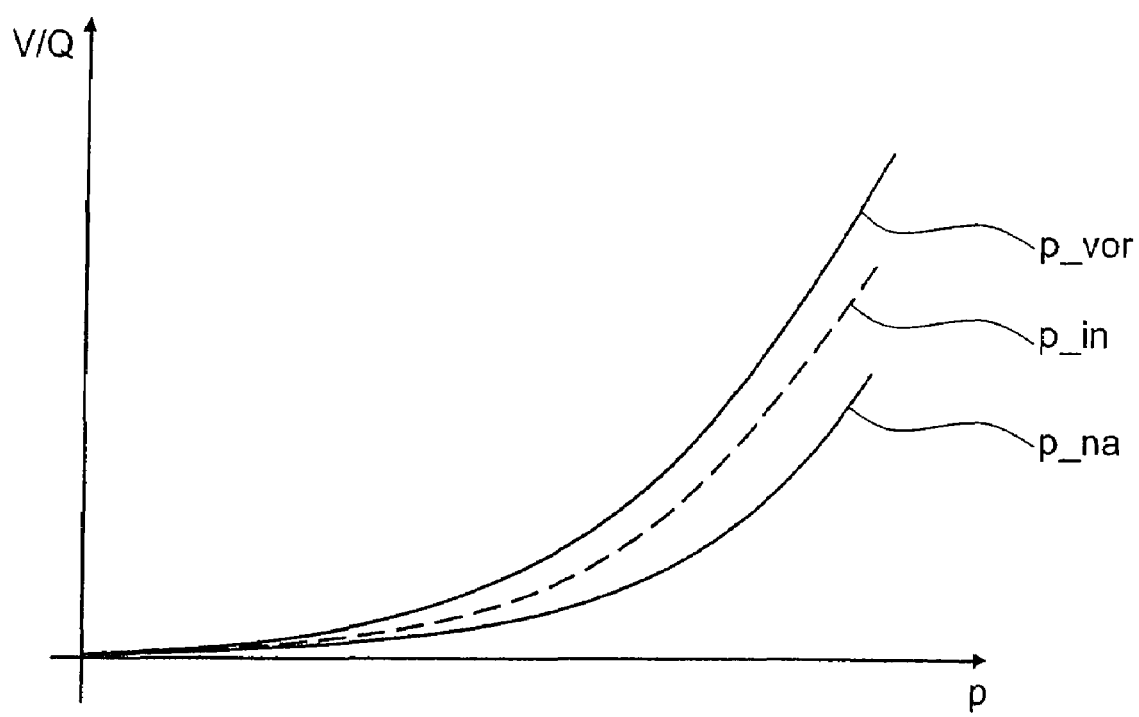
FIG. 2 is a graphical comparison of the volume/pressure characteristic of the starter mechanism of FIG. 1A in the inlet area of the hydraulic chamber, directly in the hydraulic chamber, and in the return area of the hydraulic chamber.

FIG. 2 shows a comparison of three volume flow/pressure characteristics of the device 1, in the inlet area of the hydraulic chamber 6, inside the hydraulic chamber 6, and in the return area of the hydraulic chamber 6. From this, it emerges that the hydraulic pressure p_vor in the inlet area of the hydraulic chamber 6, which corresponds essentially to the lubrication pressure p_SD set by the second pressure relief valve DBV2, is higher than the hydraulic pressure p_in present inside the hydraulic chamber 6. It can also be seen that the hydraulic pressure p_na, acting in the return area of the hydraulic chamber 6, is lower than the hydraulic pressure p_in inside the hydraulic chamber 6, the hydraulic pressure p_na in the return area of the hydraulic chamber 6 resulting essentially from the flow resistance of the cooler 13 and the flow resistance of the supply current 2 of the transmission unit located downstream from the cooler 13. This means that, depending on the respective hydraulic pressure p_vor or p_na delivered to the second back pressure outlet control port 2 of the first pressure relief valve DBV1, a correction should preferably be made in order to reflect the pressure situation actually prevailing in the hydraulic chamber 6 exactly in the in the area of the first pressure relief valve DBV1.

The deviations occurring between the values p_vor, p_in and p_na of the hydraulic pressure in the inlet area of the hydraulic chamber 6, the hydraulic chamber 6 itself and the return area of the hydraulic chamber 6, are caused by hydrodynamic flow losses which, in the present case, are compensated by establishing an appropriate area ratio between an active surface area 14 of the valve slide DBV1_S of the first pressure relief valve DBV1 that corresponds with the second back pressure outlet control port DBV12, and another active surface area 15 of the valve slide DBV1_S that corresponds with the first back pressure outlet control port DBV16 of the first pressure relief valve DBV1.

Figure 3:
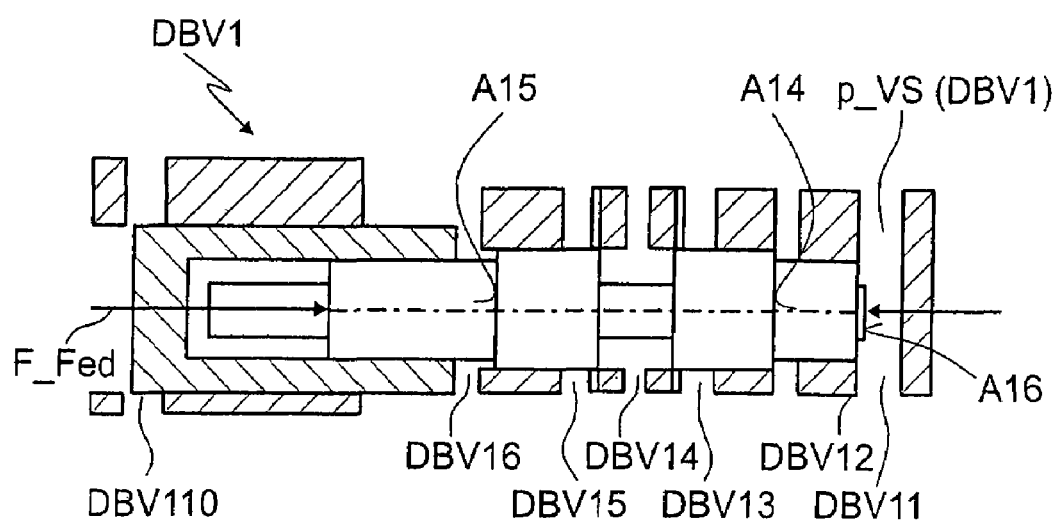
FIG. 3 is the first pressure relief valve of the device represented in FIG. 1A, in a very schematic, enlarged longitudinal section view, shown in isolation.

FIG. 3 shows an enlarged, detailed longitudinal section of the first pressure relief valve DBV1, which is designed with a valve step-up ratio appropriate for compensating for the difference between the hydraulic pressure p_vor or p_na delivered to the second return control port DBV12 and the hydraulic pressure p_in inside the hydraulic chamber 6 in the operating temperature range of the device 1. If the hydraulic pressure p_in inside the hydraulic chamber 6 were returned to the second back pressure outlet control port DBV12 of the first pressure relief valve DBV1, the area ratio between the active surface area 14 and the other active surface area 15 of the valve slide DBV1_S could be equal to one.

In contrast, when the hydraulic pressure p_vor in the inlet area of the hydraulic chamber 6 or the pressure p_na in the return area of the hydraulic chamber 6 is delivered to the first pressure relief valve DBV1, the area ratio of one has to be corrected as described below.

The pressure loss between the inlet and outlet of the hydraulic chamber 6 and the hydraulic pressure in the hydraulic chamber 6 that acts in opposition to the working pressure p_A in the piston chamber 4 are taken into account in the said correction, so that an effective pressure p_eff exerted on the piston 9 can be determined in accordance with the following formulaic relationship:

$$p\_eff = p\_VS(DBV1) \times A16/A15 + p\_vor/na \times A14/A15 - F\_Fed/A15.$$

In this, the variable F_Fed is the spring force DBV_F of the spring device DBV1, a variable A16 is the end area of the valve slide DBV1_S, upon which the pilot pressure p_VS (DBV1) acts, a variable A15 is the active surface area 15 of the valve slide DBV1_S in the area of the first back pressure outlet control port DBV16 and a variable A14 is the active surface area 14 of the valve slide DBV1_S in the area of the second back pressure outlet control port DBV12.

Because of the pressure losses, the valve step-up ratio of the first pressure relief valve DBV1 or the area ratio of the active surface areas 14 and 15 of the valve slide DBV1_S of the first pressure relief valve DBV1 in the area of the two back pressure outlet control ports DBV12 and DBV16 must be corrected, in the case of the return of the hydraulic pressure p_vor by a factor f_vor smaller than one and, in the case of the return of the hydraulic pressure p_na in the return area of the hydraulic chamber 6 by a factor f_na larger than one, compared with the area ratio of one. In this, if the pressure loss in the inlet and outlet lines are almost equal, the correction factor f_vor can be determined from the following formulaic relationship:

$$f\_vor = (p\_vor + p\_na)/(2 \times p\_vor).$$

On the other hand, the correction factor f_na can be determined from:

$$f\_na = (p\_vor + p\_na)/(2 \times p\_na).$$

FIG. 4A shows a hydraulic layout of a second embodiment of a device 1, according to the invention, which differs form the hydraulic layout of the first example embodiment, shown in FIG. 1A, essentially only in the design of the first pressure relief valve DBV1. For that reason, what follows only the differences between the two example embodiments will be described while, as regards the function of the device 1, according to FIG. 4A, reference should essentially be made to the description presented above.

The first pressure relief valve DBV1 of the device 1 in FIG. 4A comprises, in addition to the control ports DBV11 to DBV16 and DBV10, three further control ports DBV17, DBV18 and DBV19, in order to pass the pilot pressure p_VS (DBV2) of the second pressure relief valve DBV2 that can be adjusted by the second pressure control valve 11, via an inlet control port DBV19 and an outlet control port DBV18 of the first pressure relief valve DBV1, starting from the second pressure control valve 11, to the second pressure relief valve DBV2. The outlet control port DBV18 can be connected by virtue of the valve slide to a pressure relief control port DBV17 when the connection between the inlet control port DBV19 and the outlet control port DBV18 of the first pressure relief valve DBV1 is blocked by the valve slide. In this way the line segment between the outlet control port DBV18 and the second pressure relief valve DBV2 can be relieved via the pressure relief control port DBV17 towards the unpressurized hydraulic fluid reservoir connected to it.

With a first pressure relief valve DBV1 made in this way, the second pressure relief valve DBV2 can only be acted upon by the pilot pressure p_VS(DBV2) or p_VS_sys when the valve slide DBV1_S of the first pressure relief valve DBV1 is in an appropriate position so that, for example, a system pressure increase produced by the second pressure control valve 11 only has an effect upon the control of the second pressure relief valve DBV2 if the pilot pressure p_VS(DBV2) in the area of the first pressure relief valve DBV1 is passed through towards the second pressure relief valve DBV2.

FIG. 4B shows a representation, corresponding to FIG. 1B, of variations of the working pressure p_A and the lubrication pressure p_SD, these variations corresponding essentially to the variations shown in FIG. 1B so that at this point reference should be made to the description presented earlier concerning FIG. 1B.

Figures 5A, 5B:
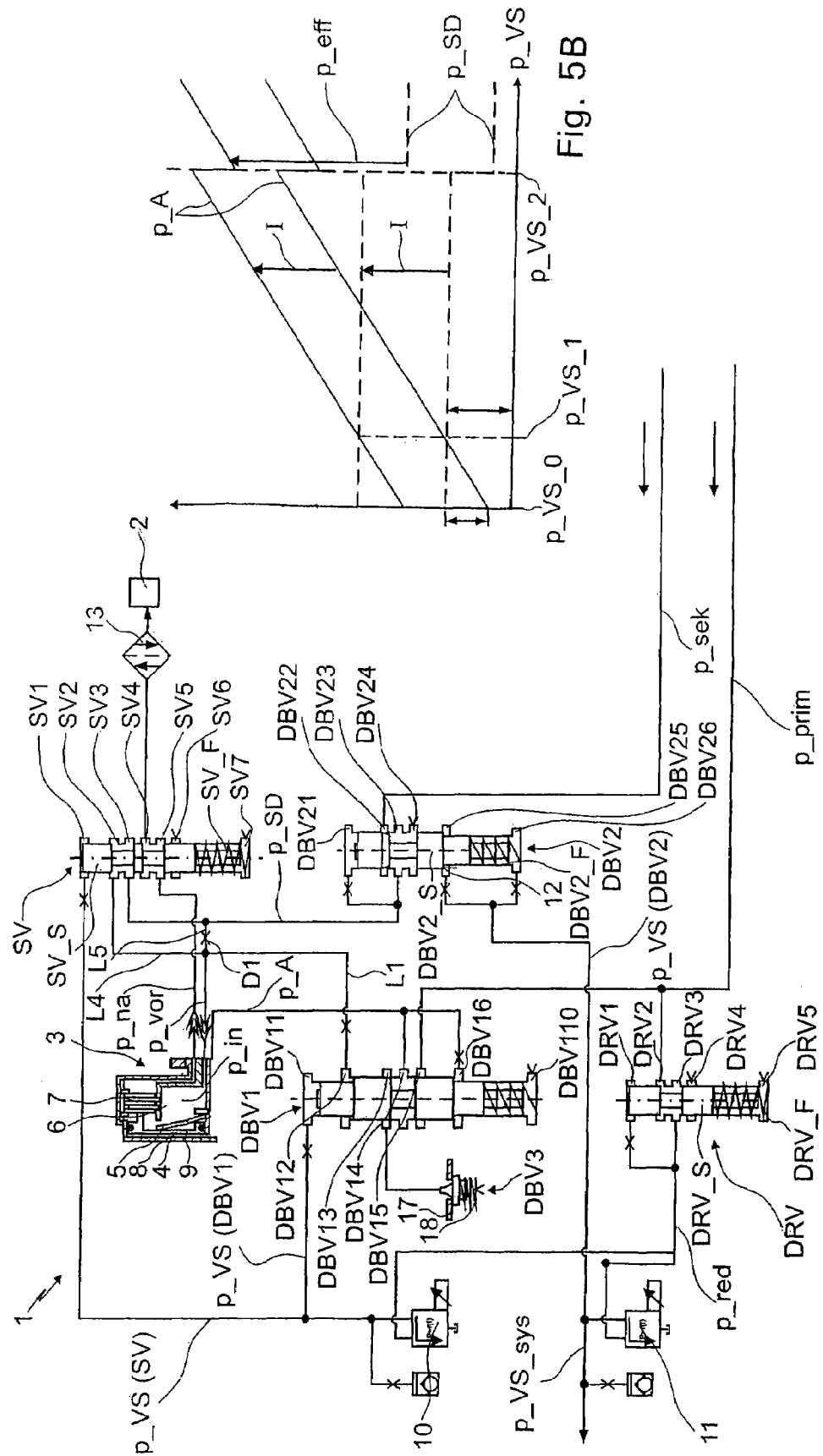
FIG. 5A is a hydraulic layout of a further example embodiment of the device according to the invention, which is made with an additional pilot valve.
FIG. 5B are variations of the working pressure in the inlet area of the piston chamber and variations of the hydraulic pressure in the inlet area of the hydraulic chamber downstream from the pilot valve of the device shown in FIG. 5A.

FIG. 5A shows a hydraulic layout of a third example embodiment of a device 1, according to the invention, which differs from that shown in FIG. 1A of the device 1 in comprising an additional pilot valve SV arranged both in the flow path of the hydraulic fluid between the second pressure relief valve DBV2 and the hydraulic chamber 6, and between the hydraulic chamber 6 and the cooler 13.

The pilot valve SV is made with several control ports SV1 to SV7, a valve slide SV_S and a spring device SV_F, such that the pilot valve SV can be acted upon in the area of an end face of the valve slide SV_S facing away from a spring device SV_F by a pilot pressure p_VS(SV), which can be adjusted by way of the first pressure control valve 10 and which corresponds to a pilot pressure p_VS(DBV1) of the first pressure relief valve DBV1, in opposition to a spring force of the spring device SV_F.

The remainder of the hydraulic layout of the device 1 in FIG. 5A essentially corresponds to that of the device 1 in FIG. 1A, so the description presented below relates to the area of the hydraulic layout of the device in FIG. 5A which is connected to a pilot valve SV.

The lubricant pressure control port DBV23 of the second pressure relief valve DBV2 is connected with the lubricant pressure control port SV3 of the pilot valve SV, which in the initial position of the pilot valve SV, shown in FIG. 5A, is connected by the valve slide to the inlet control port SV2 of the pilot valve. Thus, the lubricant pressure p_SD, adjusted by the second pressure relief valve DBV2, is passed via the pilot valve SV towards the hydraulic chamber 6 of the starter device 3 and the second back pressure outlet control port DBV12 of the first pressure relief valve DBV1 and, as a function of the secondary pressure p_sek on the second pressure relief valve DBV2, a hydraulic fluid volume flow, corresponding to the lubrication pressure p_SD, flows through the hydraulic chamber 6.

In the position of the valve slide SV_S of the pilot valve SV, shown in FIG. 5A, the hydraulic fluid volume flow emerging from the hydraulic chamber 6 is passed via the outflow control port SV4 connected on the valve slide side to the back pressure outlet control port SV5, towards the cooler 13 and the supply circuit 2 of the transmission unit.

FIG. 5B shows a representation corresponding to FIG. 1B, of variations of the working pressure p_A and the lubrication pressure p_SD against the pilot pressure p_VS(DBV1) or p_VS(SV) and a pilot pressure p_VS(DBV2) or p_VS_sys, the variations of the lubrication pressure p_SD corresponding to the hydraulic pressure values produced downstream from the pilot valve SV between the latter and the hydraulic chamber 6 during the operation of the device 1.

The variations of the working pressure p_A and the lubrication pressure p_SD, shown in FIG. 5B, correspond qualitatively to their respective variations, shown in FIG. 1B, in a pilot pressure p_VS range between the first pilot pressure value p_VS_0 and a third pilot pressure value p_VS_2, at which the valve slide SV_S of the pilot valve SV, starting from the position shown in FIG. 5A, is pushed in the direction of a spring chamber control port SV7 so that the connection between the lubrication pressure control port SV3 of the pilot valve SV and the inlet control port SV2 of the pilot valve SV is progressively blocked by the valve slide, while the connection between the lubrication pressure control port SV3 and the outlet control port SV4 of the pilot valve SV actively connected to the cooler 13 is open in such a manner that the hydraulic fluid volume flow passing via the second pressure relief valve DBV2 to the pilot valve SV no longer flows towards the hydraulic chamber 6, but towards the supply circuit 2 of the transmission unit.

The diversion of the hydraulic fluid volume flow adjusted by the second pressure relief valve DBV2 away from the hydraulic chamber 6 and towards the supply circuit 2 is effected when the starter mechanism 3 is fully engaged and is operating with no slip. In such an operating condition of the starter mechanism 3, essentially only a small hydraulic fluid volume flow is still needed through the hydraulic chamber 6 in order to dissipate any heat produced in the area of the disk packet 7 of the starter mechanism 3.

The hydraulic fluid flowing out via the return from the hydraulic chamber 6 towards the pilot valve SV is passed, via the back pressure outlet control port SV5, and the relief control port SV6 connected to the latter when the connection between the lubrication pressure control port SV3 and the inlet control port SV2 is blocked by the valve slide, towards the unpressurized hydraulic fluid reservoir connected to it.

The switching of the pilot valve SV to the third pilot pressure valve p_VS_2 leads to a sudden fall of the lubrication pressure p_SD or hydraulic pressure p_vor in the area between the pilot valve SV and the hydraulic chamber 6, the pressure fall being governed by a control line L5 that extends between a control line L3 extending between the second pressure relief valve DBV2 and the pilot valve SV and a control line L4, extending between the pilot valve SV and the hydraulic chamber 6; the line L5 having a throttle device D1. This means that the fall of the lubrication pressure p_SD, occurring at the third pilot pressure value p_VS_2 in the area between the pilot valve SV and the hydraulic chamber 6, is controlled by the throttle action of the throttle D1.

Since the working pressure p_A is determined by the lubrication pressure p_SD fed back to the second back pressure outlet control port DBV12 of the second pressure relief valve DBV1, the working pressure p_A also falls at the third pilot pressure value p_VS_2 at which the pilot valve SV switches over by the same amount as the fall of the lubrication pressure p_SD. Thereafter, the variations of the lubrication pressure p_SD in the area of the control line L4 show a constant course as a function of the pilot pressure p_VS(DBV2), while the variations of the working pressure p_A increase with increasing pilot pressure values p_VS proportionally to the pilot pressure p_VS(DBV1).

A hydraulic layout of another example embodiment of a device 1, according to the invention, is shown in FIG. 6A, which differs from the device 1 in FIG. 5A only in the area of the pilot valve SV so that in the description given below essentially only this area will be referred to.

The pilot valve SV of the device 1 in FIG. 6A is made with an additional outlet control port SV8, which is connected to the outlet control port SV4. Here, a control line L6, provided downstream from the additional outlet control port SV8, which connects the latter to the outlet control port SV4, is fitted with a throttle device D2 by way of which, after the pilot valve SV has been switched at the third pilot pressure value p_VS_2, a higher flow resistance can be produced downstream from the pilot valve SV compared with the pilot valve SV of the device 1, according to FIG. 5A.

This results from the fact that before the pilot valve SV is switched, the hydraulic fluid volume flow controlled by the second pressure relief valve DBV2 passes through the pilot valve SV into the hydraulic chamber 6 and then from the hydraulic chamber 6, via the pilot valve SV, towards the cooler 13 and the supply circuit 2. After the pilot valve SV has been switched over, the hydraulic fluid volume flow controlled by the second pressure relief valve DBV2, starting from the lubrication pressure control port SV3 of the pilot valve SV, passes directly towards the cooler 13 and the supply circuit 2 without flowing through the hydraulic chamber 6 and the control lines of the device 1 that lead into and from the hydraulic chamber 6. Accordingly, in the device 1 of FIG. 5A, after the pilot valve SV has been switched over, there is less counter-pressure against the second pressure relief valve DBV2 in the area of the lubrication pressure control port DBV23 and the return control port DBV21 than there is in the case of the device 1, according to FIG. 6A, which is provided with the throttle device D2 in the area of the control line L6. In a simple manner, this avoids an increase of the lubrication oil volume flow in the area of the second pressure relief valve DBV2 due to a reduction of the back-pressure downstream from the second pressure relief valve DBV2.

FIG. 6B shows variations of the working pressure p_A in the inlet areas of the piston chamber 4 and of the lubrication pressure p_SD in the inlet area of the hydraulic chamber 6 of the starter mechanism 3, these variations corresponding essentially to the variations shown in FIG. 5B, so that reference should be made here to the description concerning FIG. 5B.

FIG. 7A shows a hydraulic layout of a further embodiment of a device 1 according to the invention, which corresponds to the example embodiment shown in FIG. 6A and differs from the device 1 of FIG. 6A in the pilot pressure area of its pilot valve SV.

The pilot valve SV can be acted upon with a pilot pressure both via the first pressure control valve 10 and via an additional magnetic valve 20, the choice of the pilot pressure with which the pilot valve SV is controlled being made by way of an OR-valve 21 made in the form of a ball valve. By virtue of the magnetic valve 20 or additional actuator, it is possible to adjust the starter mechanism 3 to a slipping operation mode, along with a lower system pressure and working pressure p_A.

FIG. 7B shows variations of the working pressure p_A and the lubrication pressure p_SD in the inlet area of the hydraulic chamber 6 during the operation of the device 1 in FIG. 7A, and since these variations correspond basically to those shown in FIG. 6B, reference should be made to the description concerning FIG. 5B.

FIG. 8A shows a hydraulic layout of another example embodiment of a device 1, according to the invention, which is provided for the control of a starter mechanism 3 made as a wet-operating starter clutch and differs from the example embodiment, shown in FIG. 7A, in the area of the pilot valve SV.

Figures 9A, 9B:
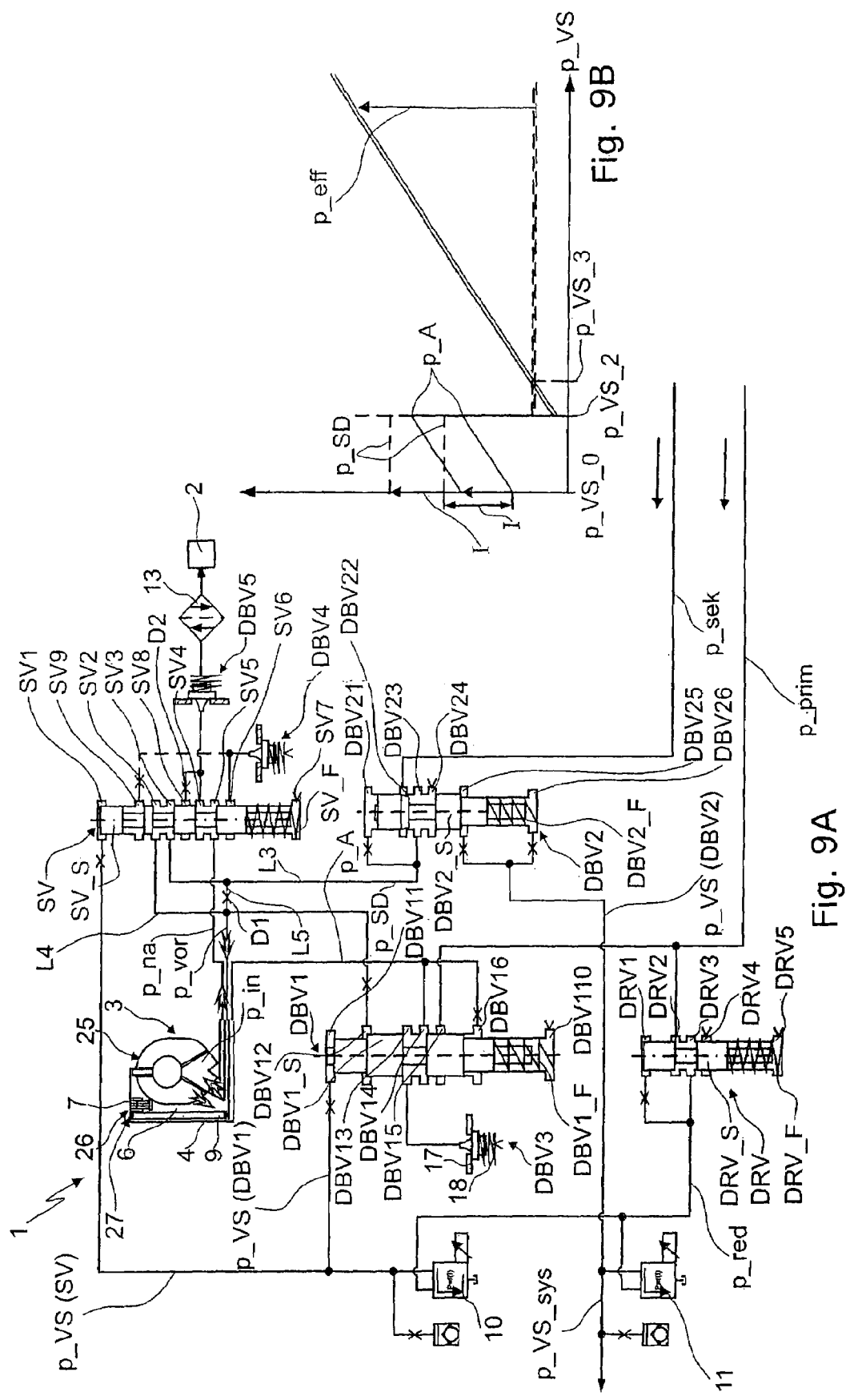
FIG. 9A is a hydraulic layout of a further example embodiment of a device according to the invention for the operation of a three-line converter.
FIG. 9B are variations of the working pressure in the inlet area of the piston chamber of the converter bridging clutch of the three-line converter, and of the hydraulic pressure in the inlet area of the hydraulic chamber of the hydrodynamic torque converter of the three-line converter downstream from the pilot valve, produced by pilot pressures of the first and second pressure relief valves and the pilot valve of the device shown in FIG. 9A.

In addition, FIG. 9A shows the device 1 of FIG. 8A, by way of which a starter mechanism 3 made as a so-termed three-line converter can be operated. In the starter mechanism 3, according to FIG. 9A, the torus chamber of a hydrodynamic torque converter 25 delimits the hydraulic chamber 6, while the piston chamber 4 of the starter mechanism 3 is delimited by a housing 26 and by the piston 9 of a converter bridging clutch 27 associated with the hydrodynamic torque converter 25.

The peripheries surrounding the starter mechanism 3 of the device 1, according to FIG. 8A, and the starter mechanism 3 of the device 1 in FIG. 9A are made identically. However, owing to the different functionalities of their starter mechanisms 3, the devices 1 in FIGS. 8A and 9A are operated differently, as shown by the variations, respectively depicted in FIGS. 8B and 9B, of the working pressure p_A in the inlet area of the piston chamber 4 and of the lubrication pressure p_SD in the inlet area of the hydraulic chamber 6 of the starter mechanism 3 of the device 1, according to FIG. 8A, and the starter mechanism 3 of the device 1, according to FIG. 9A, the variations shown in FIG. 8B corresponding in principle to the variations shown in FIG. 5B.

A hydraulic layout of a further example embodiment of a device 1, according to the invention, is shown in FIG. 10A, such that by way of the device 1 a starter mechanism 3, made as a so-termed two-line converter, can be operated. Here, the periphery surrounding the starter mechanism 3 of the device 1 in FIG. 10A corresponds essentially to the peripheries of the devices 1 in FIGS. 8A and 9A.

The principal difference, between the devices 1 in FIGS. 8A and 9A and the device 1 according to FIG. 10A, stems from the system-related difference of a two-line converter compared with a three-line converter and compared with a wet-operating starter clutch, since when the converter bridging clutch is disengaged, there is a flow from the inlet control port SV2 of the pilot valve SV around the two-line converter, and then the return of the two-line converter is passed in the direction of the working pressure control port DBV_14 of the first pressure relief valve DBV1.

To enable the hydraulic fluid volume flow passing through the starter mechanism 3 made as a two-line converter then to be passed through the cooler 13 and the supply circuit 2 downstream from the cooler 13, the back pressure outlet control port DBV13 of the first pressure relief valve DBV1, otherwise than in the devices 1, according to FIGS. 8A and 9A, is connected via a control line L10 to the back pressure outlet control port SV5 of the pilot valve SV. When the converter bridging clutch 27 of the starter mechanism 3 of the device 1 in FIG. 10A is disengaged, the back pressure outlet control port SV5 of the pilot valve SV is connected by the valve slide to the outlet control port SV4 of the pilot valve SV, so that the hydraulic fluid passing via the two-line converter can pass to the cooler 13 and then to the supply circuit 2. This means that the working pressure p_A delivered to the piston chamber 4 by the working pressure control port DBV14 of the first pressure relief valve DBV1 in the devices 1, shown in FIGS. 1A to 9A, in the case of the starter mechanism 3 of the device 1, according to FIG. 10A, first corresponds to the return pressure of the piston chamber 4 of the starter mechanism 3.

FIG. 10B respectively shows two variations of the lubrication pressure p_SD between the pilot valve SV and the starter mechanism 3 and of the working pressure p_A between the starter mechanism 3 and the pilot valve SV or between the starter mechanism 3 and the first pressure relief valve DBV1, against the pilot pressure p_VS(DBV1) or p_VS(SV).

At the first pilot pressure value p_VS_0, the working pressure p_A is lower than the lubrication pressure p_SD, so that the lubrication pressure p_SD is the inlet pressure p_vor of the hydraulic chamber 6 of the two-line converter or starter mechanism 3 of the device 1 in FIG. 10A, and the working pressure p_A in principle corresponds to the return pressure p_na of the hydraulic chamber 6 of the two-line converter 3. With increasing pilot pressure values p_VS, the variations of the working pressure p_A increase proportionally to the pilot pressure p_VS, while the variations of the lubrication pressure p_SD show a constant course. At the third pilot pressure value p_VS_2, the pilot pressure p_VS(SV) of the pilot valve SV reaches a value at which, from the position shown in FIG. 10A, the pilot valve SV switches over completely in the direction of the spring chamber control port SV7, so that the lubrication pressure p_SD falls abruptly to a value determined by the throttle action of the throttle D1.

Since the lubrication pressure p_SD is exerted on the second back pressure outlet port DBV12 of the first pressure relief valve DBV1, the variations of the working pressure p_A also decline by the amount of the pressure drop of the lubrication pressure p_SD. As the pilot pressure values p_VS increase further, the variations of the working pressure p_A increase proportionally to the pilot pressure p_VS, while the variations of the lubrication pressure p_SD remain constant at the pressure level determined by the throttle device D1. At a fourth pilot pressure value p_VS_3, the working pressure p_A exceeds the lubrication pressure p_SD so that the converter bridging clutch 27 of the starter mechanism 3 engages and the transmission capacity of the converter bridging clutch 27 increases with increasing effective pressure p_eff, which corresponds to the difference between the working pressure p_A and the lubrication pressure p_SD, until it reaches its full value.

Compared to the device 1 according to FIG. 7A, the pilot valve SV in the devices of FIGS. 8A to 10A is made with an additional pressure relief control port SV9 which, by way of the valve slide, can be brought into active connection with the inlet control port SV2 of the pilot valve SV.

Furthermore, the back pressure outlet port SV5 in the devices 1, according to FIGS. 8A to 10A, can be connected via a fourth pressure relief valve DBV4 to the unpressurized hydraulic fluid reservoir. The fourth pressure relief valve DBV4 essentially has the same structure as the third pressure relief valve DBV3, such that a converter foot point is set by virtue of the fourth pressure relief valve DBV4 made as a so-termed converter foot-point valve in the area of the pilot valve SV.

In addition, downstream from the pilot valve SV between the pilot valve SV and the cooler 13, a fifth pressure relief valve DBV5 is provided, whose design structure is in principle the same as that of the third pressure relief valve DBV3. The fifth pressure relief valve DBV5 is a so-termed converter non-return valve, by way of which emptying of the hydraulic chamber 6, which is optionally the converter torus or the clutch torus, is prevented when the hydraulic pump is switched off. Here, instead of arranging the fifth pressure relief valve DBV5 between the pilot valve SV and the cooler 13 as illustrated in the drawing, the fifth pressure relief valve DBV5 can also be arranged in the return area of the hydraulic chamber 6 of the starter mechanism 3 between the starter mechanism 3 and the pilot valve SV.

Basically, the hydraulic pressure needed in order to close a starter mechanism corresponds to the effective pressure p_eff exerted on the piston of a wet-operating starter clutch or a converter bridging clutch, which is equal to the difference between the working pressure p_A in the piston chamber and the lubricating pressure p_SD or hydraulic pressure p_in acting inside the hydraulic chamber 6. To be able to ensure the transmission capacity of the frictional shift element, i.e., the wet-operating starter clutch or the converter bridging clutch, it may be necessary in certain operating conditions of the device 1 to increase the system pressure p_sys by increasing the pilot pressure p_VS_sys of the second pressure control valve 11.

For example, if the hydraulic pressure p_in inside the hydraulic chamber 6 of a starter mechanism 3 amounts to 4 bar, in order to engage the frictional shift element of the starter mechanism 3 the working pressure p_A in the piston chamber 4 must be at least 5 bar in order to overcome the counter-pressure p_in within the hydraulic chamber 6 as well as the spring force of the spring device 5 of the starter mechanism 3, which can, for example, correspond to 1 bar. Since the minimum system pressure in many operating conditions of a transmission unit does not exceed 5 bar, a boost of the system pressure is needed. However, such a system pressure boost has a negative effect when it exceeds the system pressure needs of other shift elements of the starter mechanism 3.

For that reason the system pressure is only boosted when a high corresponding through-flow is needed through the hydraulic chamber of a starter mechanism and through a cooler connected in series with the hydraulic chamber and through a supply circuit of the transmission unit located downstream from the cooler.

Particularly with a starter mechanism made as a wet-operating disk clutch, a higher through-flow through the hydraulic chamber may be required for a longer time after the clutch has been engaged, whereas with a starter mechanism made as a two-line or a three-line converter, the flow through the hydraulic chamber of a starter mechanism can be reduced directly before the adjustment of the converter bridging clutches. From this, it follows that starter mechanisms with torque converters basically do not need any exceptional system pressure boost in order to produce a sufficient effective pressure.

All the devices 1, according to FIGS. 5A to 10A, have the common feature that in the event of a possible reduction of the through-flow passing through the hydraulic chamber 6 of the starter mechanism 3, the hydraulic fluid volume flow passing downstream from the second pressure relief valve DBV2 is switched from a series to a parallel path.

This avoids pronounced frothing of the oil, which occurs during prolonged series through-flow through the hydraulic chamber since the transmission pump then has to deliver a large volume flow from the transmission sump through an oil filter.

After the transition from series to parallel flow, in each case the volume flowing through and cooling the starter mechanisms 3 on the way to the transmission sump can be reduced by throttle control in the area of the throttle D1, while the transmission lubrication in the area of the supply circuit takes place directly via the pilot valve made as a pressure relief valve.

| Reference numerals | |
|---|---|
| 1 | device |
| 2 | supply circuit |
| 3 | starter mechanism |
| 4 | piston chamber |
| 5 | spring device of the starter mechanism |
| 6 | hydraulic chamber |
| 7 | disk packet |
| 8 | housing |
| 9 | piston |
| 10 | pressure control valve |
| 11 | other pressure control valve |
| 12 | active surface area |
| 13 | cooler |
| 14 | first active surface area |
| 15 | second active surface area |
| 17 | valve plate |
| 18 | spring device |
| 20 | magnetic valve |
| 21 | or-valve |
| 25 | hydrodynamic torque converter |
| 26 | housing |
| 27 | converter bridging clutch |
| A14, A15, A16 | variables |
| D1, D2 | throttle device |
| DBV1 to DBV5 | pressure relief valve |
| DBV11 to DBV110 | control ports of the first pressure relief valve |
| DBV1_F | spring device |
| DBV1_S | valve slide |
| DBV21 to DBV26 | control ports of the second pressure relief valve |
| DBV2_F | spring device |
| DBV2_S | valve slide |
| DRV | pressure regulation valve |
| DRV_F | spring device |
| DRV1 to DRV5 | control ports of the pressure regulation valve |
| DRV_S | valve slide |
| F_Fed | variable |
| f_na | correction factor |
| f_vor | factor |
| L1, L3, L4, L5, L10 | control lines |
| p_A | Working pressure |
| p_eff | effective pressure |
| p_prim | primary pressure |
| p_SD | lubrication pressure |
| p_sek | secondary pressure |
| p_vor, p_in, p_na | hydraulic pressure |
| p_VS | pilot pressure |
| p_VS(DBV1) | pilot pressure |
| p_VS(DBV2) | pilot pressure |
| p_VS(SV) | pilot pressure |
| p_VS,sys | pilot pressure |
| p_VS-0 to p_VS_3 | pilot pressure value |
| SV | pilot valve |
| SV1 to SV9 | control ports of the pilot valve |
| SV_F | spring device |
| SV_S | valve slide |

The invention claimed is:

1. A system (1) controlling a starter mechanism (3) which is actively connected with a hydraulic supply circuit (2) of a transmission unit, the system comprising:
   the starter mechanism having a converter bridging clutch (27), a piston chamber (4) and a hydraulic chamber (6), the converter bridging clutch (27) being actuated, upon introduction of a working pressure (p_A) into the piston chamber (4), and an area of the starter mechanism (3) being cooled and lubricated upon introduction of a lubrication pressure (p_SD) to the a hydraulic chamber (6);
   a first pressure relief valve (DBV1) regulating the working pressure (p_A) delivered to the piston chamber (4);

a second pressure relief valve (DBV2) regulating the lubrication pressure (p_SD) delivered to the hydraulic chamber (6);

a first pilot pressure (p_VS(DBV1)) controlling a valve slide (DBV1_S) of the first pressure relief valve (DBV1), and a first pressure control valve (10) and a first spring device (DBV1_F) controlling the first pilot pressure (p_VS(DBV1));

a second pilot pressure (p_VS(DBV2)) controlling a valve slide (DBV2_S) of the second pressure relief valve (DBV2), and a second pressure control valve (11) and a second spring device (DBV2_F) controlling the second pilot pressure (p_VS(DBV2));

the working pressure (p_A) exerting force on a first back pressure outlet port (DBV16) of the first pressure relief valve (DBV1) and the lubrication pressure (p_SD) exerting force on a back pressure outlet port (DBV21) of the second pressure relief valve (DBV2);

a hydraulic pressure (p_vor, p_in, p_na), in an area between a lubrication pressure control port (DBV23) of the second pressure relief valve (DBV2) and a return area of the hydraulic chamber (6), exerting a force on a second back pressure outlet port (DBV12) of the first pressure relief valve (DBV1), and the hydraulic pressure (p_vor, p_in, p_na) being equivalent to the lubrication pressure (p_SD); and the hydraulic pressure (p_vor, p_in, p_na) exerting a force on the valve slide (DBV1_S) of the first pressure relief valve (DBV1) in an opposing direction to the force of the working pressure (p_A) exerted on the first back pressure outlet port (DBV16) of the first pressure relief valve (DBV1), such that a feed-back of the hydraulic pressure (p_vor, p_in, p_na) exerted on the first pressure relief valve (DBV1) is added to a pilot signal characteristic of the first pressure relief valve (DBV1).

2. The system according to claim 1, wherein a first active surface area (14) of the valve slide (DBV1_S) of the first pressure relief valve (DBV1), influenced in an area of the second back pressure outlet port (DBV12) by the hydraulic pressure (p_in), is essentially equivalent to a second active surface area (15) of the valve slide (DBV1_S) of the first pressure relief valve (DBV1), and the second active surface area (15) of the valve slide (DBV1_S) of the first pressure relief valve (DBV1) is influenced by the working pressure (p_A) via the first back pressure outlet port (DBV16) of the first pressure relief valve (DBV1) during return flow of the hydraulic pressure (p_in) from a return area of the hydraulic chamber (6) to the second back pressure outlet port (DBV12) of the first pressure relief valve (DBV1).

3. The system according to claim 1, wherein a first active surface area (14) of the valve slide (DBV1_S) of the first pressure relief valve (DBV1), influenced in an area of the first back pressure outlet port (DBV16) by the hydraulic pressure (p_vor), is smaller than a second active surface area (15) of the valve slide (DBV1_S) of the first pressure relief valve (DBV1) influenced by the working pressure (p_A) via the second back pressure outlet port (DBV12) of the first pressure relief valve (DBV1), during return flow of the hydraulic pressure (p_vor) from an inlet area hydraulic chamber (6) to between the second pressure relief valve (DBV2) and the second back pressure outlet port (DBV12) of the first pressure relief valve (DBV1).

4. The system according to claim 1, wherein a first active surface area (14) of the valve slide (DBV1_S) of the first pressure relief valve (DBV1), influenced in an area of the first back pressure outlet port (DBV16) by the hydraulic pressure (p_na), is larger than a second active surface area (15) of the valve slide (DBV1_S) of the first pressure relief valve (DBV1) influenced by the working pressure (p_A) via the first back pressure outlet port (DBV16) of the first pressure relief valve (DBV1) during return flow of the hydraulic pressure (p_na) from the hydraulic chamber (6) to a return area of the second back pressure outlet port (DBV12) of the first pressure relief valve (DBV1).

5. The system according to claim 1, wherein the working pressure (p_A) exerted on the second back pressure outlet port (DBV12) of the first pressure relief valve (DBV1) opposes the first pilot pressure (p_VS(DBV1)) which is controlled by the first pressure control valve (10) and which controls the first pressure relief valve (DBV1).

6. The system according to claim 1, wherein the first pressure relief valve (DBV1) has a third back pressure outlet port (DBV13) communicating with a third pressure relief valve (DBV3) and a working pressure control port (DBV14) of the first pressure relief valve (DBV1) by way of the valve slide (DBV1_S) of the first pressure relief valve (DBV1), and the working pressure control port (DBV14) of the first pressure relief valve (DBV1) influences the piston chamber (4) with the working pressure (p_A) and actively communicates with the first back pressure outlet port (DBV16) of the first pressure relief valve (DBV1).

7. The system according to claim 6, wherein the first pressure relief valve (DBV1) has a supply control port (DBV15) communicating with a primary pressure circuit of the transmission unit, and the supply control port (DBV15) of the first pressure relief valve (DBV1) communicates with the working pressure control port (DBV14) of the first pressure relief valve (DBV1) when communication between the working pressure control port (DBV14) and a third pressure relief control port (DBV13) of the first pressure relief valve (DBV1) is blocked by the valve slide (DBV1_S).

8. The system according to claim 7, further comprising a pressure regulation valve (DRV) located between a primary pressure circuit and the first and the second pressure control valves (10, 11), a primary pressure (p_prim) of the primary pressure circuit is regulated to a reducing pressure (p_red) by the pressure regulation valve (DRV).

9. The system according to claim 1, wherein the second pressure relief valve (DBV2) comprises a supply control port (DBV22) which communicates with a secondary pressure circuit of the transmission unit, the supply control port (DBV22) further communicates with the lubrication pressure control port (DBV23) of the second pressure relief valve (DBV2) by way of the valve slide (DBV2_S), the hydraulic chamber (6) of the starter mechanism (3) is influenced by the lubrication pressure (p_SD) via the lubrication pressure control port (DBV23) of the second pressure relief valve (DBV2) which communicates with both the back pressure outlet port (DBV21) of the second pressure relief valve (DBV2) and to the second back pressure outlet port (DBV12) of the first pressure relief valve (DBV1).

10. The system according to claim 9, wherein the lubrication pressure control port (DBV23) of the second pressure relief valve (DBV2) communicates with a pressure relief control port (DBV24) of the second pressure relief valve (DBV2) when communication between the lubrication, pressure control port (DBV23) of the second pressure relief valve (DBV2) and the supply control port (DBV22) of the second pressure relief valve (DBV2) is blocked by the valve slide of the second pressure relief valve (DBV2).

11. The system according to claim 1, wherein the hydraulic chamber (6) is influenced by the lubrication pressure (p_SD)

via a pilot valve (SV) located between the second pressure relief valve (DBV2) and the hydraulic chamber (6).

12. The system according to claim 11, wherein the lubrication pressure (p_SD) influences the supply circuit (2) of the transmission unit via the pilot valve (SV).

13. The system according to claim 11, wherein a return of the hydraulic chamber (6) communicates with a back pressure outlet port (SV5) of the pilot valve (SV) which actively communicates, by way of a valve slide (SV_S) of the pilot valve (SV), with a first outlet control port (SV4) of the pilot valve (SV) which communicates with the supply circuit (2).

14. The system according to claim 11, wherein the pilot valve (SV) comprises a lubrication pressure control port (SV3) which communicates with the lubrication pressure control port (DBV23) of the second pressure relief valve (DBV2), such that the lubrication pressure control port (SV3) of the pilot valve (SV) communicates, via a valve slide (SV_S) of the pilot valve (SV), with an inlet control port (SV2) of the pilot valve (SV), and the inlet control port (SV2) of the pilot valve (SV) communicates with an inlet of the hydraulic chamber (6).

15. The system according to claim 14, wherein the lubrication pressure control port (SV3) of the pilot valve (SV) communicates with the outlet control port (SV4) of the pilot valve (SV), via the valve slide (S_VS) of the pilot valve (SV), when the communication between the lubrication pressure control port (SV3) of the pilot valve (SV) and the inlet control port (SV2) of the pilot valve (SV) is blocked by the valve slide (S_VS) of the pilot valve (SV).

16. The system according to claim 14, wherein the inlet control port (SV2) of the pilot valve (SV) communicates with the second back pressure outlet port (DBV12) of the first pressure relief valve (DBV1).

17. The system according to claim 13, wherein the pilot valve (SV) has a first pressure relief control port (SV6) which communicates with the back pressure outlet port (SV5) of the pilot valve (SV).

18. The system according to claim 17, wherein the first pressure relief control port (SV6) of the pilot valve (SV) communicates with a fourth pressure relief valve (DBV4).

19. The system according to claim 18, wherein the pilot valve (SV) has a second pressure relief control port (SV9) which communicates with an inlet control port (SV2) which is connected with the fourth pressure relief valve (DBV4).

20. The system according to claim 16, wherein a control line (L5), having a throttle device (Dl), is located between:
the lubrication pressure control port (DBV23) of the second pressure relief valve (DBV2) and the lubrication pressure control port (SV3) of the pilot valve (SV), and
the inlet control port (SV2) of the pilot valve (SV) and the second return control port (DBV12) of the first pressure relief valve (DBV1).

21. The system according to claim 13, wherein the pilot valve (SV) has a second outlet control port (SV8) which communicates with a lubrication pressure control port (SV3) of the pilot valve (SV).

22. The system according to claim 11, wherein a fifth pressure relief valve (DBV5) is located between the pilot valve (SV) and the supply circuit (2) of the transmission unit.

23. The system according to claim 11, wherein both the first pressure relief valve (DBV1) and the pilot valve (SV) are influenced by the first pilot pressure (p_VS(DBV1), p_VS (SV)) from the first pressure control valve (10).

24. The system according to claim 23, wherein the pilot valve (SV) and the first pressure control valve (10), associated with the first pressure relief valve (DBV1), are alternatively influenced by the first pilot pressure (p_VS(SV)) via an OR-valve(2l).

25. The system according to claim 1, wherein the second pressure control valve (11), which corresponds with the second pressure relief valve (DBV2), adjusts the second pilot pressure (p_VS(DBV2)) which passes, via the first pressure relief valve (DBV1), to the second pressure relief valve (DBV2).

26. The system according to claim 1, wherein the starter mechanism (3) is a wet-operating frictional disk clutch.

27. The system according to claim 1, wherein the starter mechanism (3) is a hydrodynamic torque converter and the converter bridging clutch (27) is one of a two-line converter and a three-line converter.

* * * * *